US011868566B1

(12) United States Patent
Wu

(10) Patent No.: US 11,868,566 B1
(45) Date of Patent: Jan. 9, 2024

(54) TOUCH RESPONSE METHOD, DEVICE, INTERACTIVE WHITE BOARD, AND STORAGE MEDIUM

(71) Applicants: GUANGZHOU SHIYUAN ELECTRONIC TECHNOLOGY COMPANY LIMITED, Guangzhou (CN); GUANGZHOU SHIYUAN INNOVATION TECHNOLOGY CO., LTD., Guangzhou (CN)

(72) Inventor: Shile Wu, Guangzhou (CN)

(73) Assignees: GUANGZHOU SHIYUAN ELECTRONIC TECHNOLOGY COMPANY LIMITED, Guangzhou (CN); GUANGZHOU SHIYUAN INNOVATION TECHNOLOGY, CO., LTD., Guangzhou (CN)

(*) Notice: Subject to any disclaimer, the term of this patent is extended or adjusted under 35 U.S.C. 154(b) by 0 days.

(21) Appl. No.: 18/070,690

(22) Filed: Nov. 29, 2022

Related U.S. Application Data

(63) Continuation of application No. PCT/CN2022/100098, filed on Jun. 21, 2022.

(51) Int. Cl.
G06F 3/041 (2006.01)
G06F 3/042 (2006.01)
G06F 3/04883 (2022.01)

(52) U.S. Cl.
CPC ........ *G06F 3/04186* (2019.05); *G06F 3/0421* (2013.01); *G06F 3/04883* (2013.01)

(58) Field of Classification Search
CPC . G06F 3/04186; G06F 3/0421; G06F 3/04883
See application file for complete search history.

(56) References Cited

U.S. PATENT DOCUMENTS

| 2016/0334961 | A1 | 11/2016 | Durojaiye et al. |
| 2019/0018585 | A1 | 1/2019 | Cheng |
| 2019/0302966 | A1* | 10/2019 | Yoshino .............. G06F 3/03545 |
| 2022/0027031 | A1 | 1/2022 | Gu |

FOREIGN PATENT DOCUMENTS

| CN | 103353828 A | 10/2013 |
| CN | 105867679 A | 8/2016 |
| CN | 107807781 A | 3/2018 |
| CN | 109976563 A | 7/2019 |

(Continued)

OTHER PUBLICATIONS

Extended European Search Report issued in corresponding European Application No. 22210619.7, dated Jun. 6, 2023, 5 pages.

*Primary Examiner* — Afroza Chowdhury
(74) *Attorney, Agent, or Firm* — BAYES PLLC

(57) ABSTRACT

A touch response method, device, interactive white board and storage medium are provided. The method acquires, based on infrared touch detection, touch operation data generated correspondingly by a current contact point on a writing interface. The touch operation includes a first touch operation and a second touch operation, and the first touch operation and the second touch operation are distinguished by the touch area. When there is only one touch operation, it confirms to enter a writing mode or an erasing mode according to a type of the touch operation.

18 Claims, 7 Drawing Sheets

(56) References Cited

FOREIGN PATENT DOCUMENTS

| | | |
|---|---|---|
| CN | 111694451 A | 9/2020 |
| CN | 112363657 A | 2/2021 |
| CN | 113342194 A | 9/2021 |
| CN | 114237417 A | 3/2022 |
| JP | 2017076252 A | 4/2017 |

* cited by examiner

TOUCH RESPONSE METHOD, DEVICE, INTERACTIVE WHITE BOARD, AND STORAGE MEDIUM

CROSS-REFERENCE TO RELATED APPLICATION

The present application is a continuation of International Application No. PCT/CN2022/100098, filed on Jun. 21, 2022. The entire content of the above-identified application is expressly incorporated herein by reference.

TECHNICAL FIELD

The present disclosure relates to the field of touch technology, in particular, to a touch response method, device, interactive white board and storage medium.

BACKGROUND

When writing on a terminal device based on an infrared touch frame, some users have a writing habit of supporting a screen of the terminal device with their palms. During a writing process, the infrared touch frame can obtain touch operation data by touch detection, and the terminal device can then confirm a position and a touch area of a contact point based on the touch operation data. And corresponding to interaction requirements of a writing scene, writing with a pen or supporting with a palm can be distinguished by the touch area. Specifically, when distinguishing the writing with a pen and the supporting with a palm based on the touch area, compared with a stable touch area brought by a relatively fixed shape of a hard pen tip during the writing with a pen, the supporting with a palm is deformed due to a difference in a contact angle and a contact force, thus bringing changes in the touch area. In the terminal device, different touch areas usually trigger different responses correspondingly, for example, a smaller touch area corresponds to a writing operation, and a larger touch area corresponds to an erasing operation.

The writing habit of supporting the screen with the palm of the user makes the terminal device detect multiple touch areas at the same time during the touch operation process, which may cause an operation response of the terminal device based on the touch area to be disordered and cannot accurately respond to an actual operation purpose of the user.

SUMMARY

The present disclosure provides a touch response method, device, interactive white board and storage medium, so as to solve a conventional technical problem that operation response based on the touch area is disordered and an actual operation purpose of a user cannot be accurately responded.

In a first aspect, an embodiment of the present disclosure provides a touch response method. The method includes receiving touch operation and acquiring touch operation data generated based on a current touch operation, wherein the current touch operation includes a first touch operation and a second touch operation, the touch operation data includes a touch area, the touch area of the first touch operation is not greater than a preset area threshold, and the touch area of the second touch operation is greater than the preset area threshold; when the first touch operation is received first, entering a writing mode; when the first touch operation is received first and the second touch operation starts to be received during a touch process of the first touch operation, maintaining the writing mode; when the second touch operation is received first, entering an erasing mode; after the second touch operation is received first and the erasing mode is entered, starting to receive the first touch operation during a touch process of the second touch operation, and when a moving distance of the second touch operation from an initial time of receiving the second touch operation to an initial time of receiving the first touch operation is not greater than a first distance threshold, performing mode switching to enter the writing mode from the erasing mode; and after the second touch operation is received first and the erase mode is entered, starting to receive the first touch operation during the touch process of receiving the second touch operation, and when the moving distance of the second touch operation from the initial time of receiving the second touch operation to the initial time of receiving the first touch operation is greater than the first distance threshold, maintaining the erasing mode.

In a second aspect, an embodiment of the present disclosure further provides a touch response device includes a touch-data acquiring unit, configure to receive touch operation and acquire touch operation data generated based on a current touch operation, wherein the current touch operation includes a first touch operation and a second touch operation, the touch operation data includes a touch area, the touch area of the first touch operation is not greater than a preset area threshold, and the touch area of the second touch operation is greater than the preset area threshold; a writing-mode entering unit, configured to, when the first touch operation is received first, enter a writing mode; a writing-mode maintaining unit, configured to, when the first touch operation is received first and the second touch operation starts to be received during a touch process of the first touch operation, maintain the writing mode; an erasing-mode entering unit, configured to, when the second touch operation is received first, enter an erasing mode; an erasing-mode switching unit, configured to, after the second touch operation is received first and the erasing mode is entered, start to receive the first touch operation during a touch process of the second touch operation, and when a moving distance of the second touch operation from an initial time of receiving the second touch operation to an initial time of receiving the first touch operation is not greater than a first distance threshold, perform mode switching to enter the writing mode from the erasing mode; and an erasing-mode maintaining unit, configured to, after the second touch operation is received first and the erase mode is entered, start to receive the first touch operation during the touch process of receiving the second touch operation, and when the moving distance of the second touch operation from the initial time of receiving the second touch operation to the initial time of receiving the first touch operation is greater than the first distance threshold, maintain the erasing mode.

In a third aspect, an embodiment of the present disclosure further provides an interactive white board includes one or more processors; and a memory, configured to store one or more programs; wherein when the one or more programs are executed by the one or more processors, the interactive white board realizes a touch response method according to the first aspect.

In a fourth aspect, an embodiment of the present disclosure further provides a computer-readable storage medium, on which a computer program is stored, wherein when the computer program is executed by a processor, a touch response method according to the first aspect is realized.

According to the above-mentioned touch response method, device, interactive white board and storage medium, there are following steps during the process of performing touch operation: receiving the touch operation and acquiring the touch operation data generated based on current touch operation, wherein the current touch operation includes a first touch operation and a second touch operation, the touch operation data includes a touch area, the touch area of the first touch operation is not greater than a preset area threshold, and the touch area of the second touch operation is greater than the preset area threshold; when the first touch operation is received first, entering a writing mode; when the first touch operation is received first and the second touch operation starts to be received during a touch process of the first touch operation, maintaining the writing mode; after the second touch operation is received first and the erasing mode is entered, starting to receive the first touch operation during a touch process of the second touch operation, and when a moving distance of the second touch operation from an initial time of receiving the second touch operation to an initial time of receiving the first touch operation is not greater than a first distance threshold, performing mode switching to enter the writing mode from the erasing mode; and after the second touch operation is received first and the erase mode is entered, starting to receive the first touch operation during the touch process of receiving the second touch operation, and when the moving distance of the second touch operation from the initial time of receiving the second touch operation to the initial time of receiving the first touch operation is greater than the first distance threshold, maintaining the erasing mode. When the first touch operation and the second touch operation are detected on the writing operation interface based on the infrared touch, the above solution can confirm a valid touch operation and an invalid touch operation in the two touch operations according to a sequence relationship of the two touch operations, and maintain or switch to corresponding mode according to the valid touch operation, and ignore the touch operation data corresponding to the invalid touch operation, which realizes an accurate response to the writing process, and reduces a display interference of error operation to the writing process.

DETAILED DESCRIPTION

Figure 1:
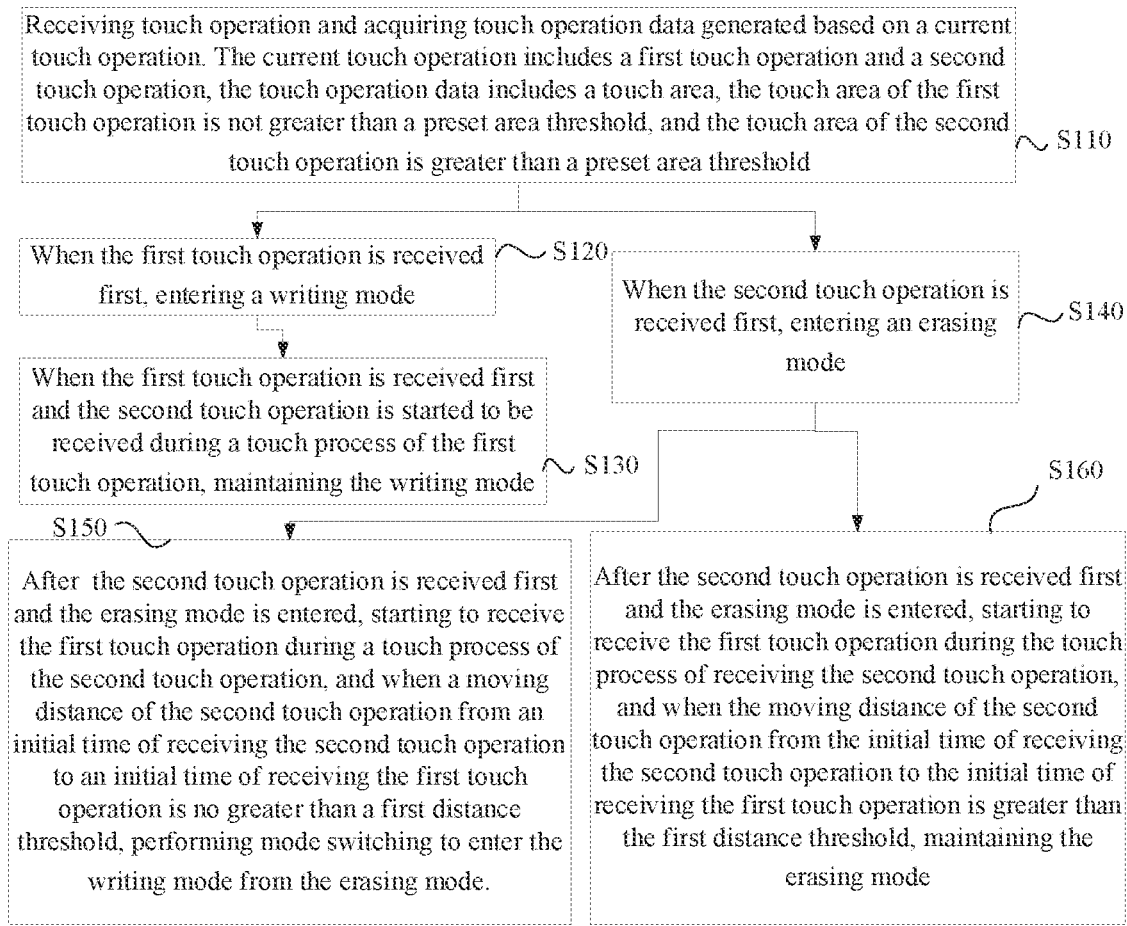
FIG. 1 is a method flowchart of a touch response method according to an embodiment of the present disclosure.

Hereinafter, the present disclosure will be further described in detail with reference to the drawings and embodiments. It can be understood that the concrete embodiments described herein are used to explain the present disclosure and not to limit the present disclosure. In addition, it should be noted that, for convenience of description, only a part of the structure related to the present disclosure is shown in the drawings, not the whole structure.

It should be noted that due to the limitation of space, the description of the present disclosure does not enumerate all optional embodiments. After reading the description of the present disclosure, those skilled in the art should be able to understand that any combination of technical features can constitute optional embodiments as long as the technical features are not contradictory.

Hereinafter, each embodiment will be described in detail.

FIG. 1 is a method flowchart of a touch response method according to an embodiment of the present disclosure. The touch response method is applied to an interactive white board. As shown in the figure, the touch response method includes:

Step S110: receiving touch operation and acquiring touch operation data generated based on a current touch operation. The current touch operation includes a first touch operation and a second touch operation, the touch operation data includes a touch area, the touch area of the first touch operation is not greater than (including less than and equal to) a preset area threshold, and the touch area of the second touch operation is greater than the preset area threshold.

For ease of understanding, in the embodiment, the interactive white board is taken as an exemplary form of the terminal device, and the detailed process of the touch response in this solution is described by an example of the interactive white board. The interactive white board can be an integrated device that controls a content displayed on a display screen and realizes human-computer interaction through touch technology. It integrates one or more functions such as projector, electronic whiteboard, curtain, audio, TV and video conference terminal. In some implementations, the interactive white board does not include the limitation of the surface features of the display surface. For example, the surface features of the interactive white board may be a plane, a curved surface, or a splicing of multiple planes.

A range covered by a graphical interface displayed on the display screen of the interactive white board may be a touch detection region for detecting operations of a user, that is, a range of the graphical interface and a touch detection region may or may not overlap. When a touch operation is performed in the touch detection region, such as when a touch pen or a finger approaches or contacts a display screen with a touch function, a touch module of the display screen can sense changes in infrared light, current, voltage, magnetic flux or pressure (corresponding to specific arrangement types of infrared display screen, capacitive display screen, resistive display screen, electromagnetic display screen or pressure sensitive display screen), so as to obtain a touch signal containing a coordinate of a touch position and trigger time of the touch signal after the conversion. According to the coordinate of the touch position and the trigger time of the touch signal, the touch data generated by the touch pen or the user's finger each time in a process from starting touch to lifting up and stopping touch can be obtained. A corresponding response is made on the display screen according to the touch data, for example, the touch data is responded as a writing process. The writing process is not limited to writing, and any input process, realized on the display screen of the interactive white board, for displaying an operation track can be regarded as a writing process. In addition, according to different display elements of an occurrence position of the touch operation, the touch operation can be responded as operations of the user, such as click, and drag. These different response modes have the same coordinate processing mode at a bottom layer. Based on hardware realization of basic functions such as touch and display, various interactive display designs of the interactive white board can be realized. It should be noted that for the perspective of user interaction experience, the display interface and the touch detection of the interactive white board area are generally the same interface, while for a notebook computer, the display interface and the touch detection region may be completely independent of each other, or may be partially independent and partially overlapped.

The interactive white board includes at least one display screen. For example, the interactive white board is configured with a display screen having a touch function, which can be an infrared display screen, a capacitance display screen, a resistance display screen, an electromagnetic display screen or a pressure-sensitive display screen. On the display screen with the touch function, the user can realize touch operation by touching the display screen with a finger or a touch pen. Correspondingly, the interactive white board detects a touch position and makes a response according to the touch position, so as to realize the touch function. When a touch sensing module used on the display screen with touch function is different, original tactile signals collected by the touch sensing module are different, and the converted touch signals are also different.

For the infrared display screen, the touch module is an infrared touch frame, the tactile signal collected by the touch module may include a signal indicating that the infrared ray is blocked, the converted touch signal may include a position touch signal, which may include X coordinate and Y coordinate of the touch position. For the capacitive display screen, the touch module is a capacitive touch panel, the tactile signal collected by the touch module may include a current flowing through each electrode of the touch screen, the converted touch signal may include a position touch signal, which may include X coordinate and the Y coordinate of the touch position. For the resistive display screen, the touch module is a resistive touch panel, the tactile signal collected by the touch module may include a voltage of the touch position, the converted touch signal may include a position touch signal, and the position touch signal may include X coordinate and the Y coordinate of the touch position. For the electromagnetic display screen, the touch module is an electromagnetic plate, the tactile signal collected by the touch module may include a variation of magnetic flux and a frequency of the received electromagnetic signal, the converted touch signal may include a position touch signal corresponding to the variation of magnetic flux and a pressure-sensitive signal corresponding to the frequency, the position touch signal may include X coordinate and Y coordinate of the touch position, and the pressure-sensitive signal may include a pressure value. For the pressure-sensitive display screen, the touch module is a pressure sensor, the tactile signal collected by the touch module may include a pressure signal, the converted touch signal may include a position touch signal, and the position touch signal may include X coordinate and Y coordinate of the touch position.

This solution is mainly aimed at the realization of the infrared display screen, that is, the touch operation data is acquired by detecting a blocking state with the infrared ray. In the infrared display screen, according to the blockage of the infrared, a size of the blocking region, i.e., an area of a contact point, can be confirmed in addition to the touch position. In this solution, a segment of continuous touch operation data is defined as coming from the same touch operation, and the touch operation data corresponding to one touch operation records position information of a whole process of the touch operation from appearance to disappearance. In the implementation of this solution based on the touch operation data detected by the infrared touch, a response is not only made based on the currently acquired touch operation data, but also a comprehensive response based on the continuous touch operation data corresponding to the touch operation. In the implementation based on the detection of infrared touch, if the blocking region detected by infrared is continuous, regardless of a shape of the blocking region, the blocking region is a contact point, and a size of the contact point is characterized by the touch area. For example, when the touch pen contacts the display screen, the blocking region is small and the corresponding touch area is small. When the palm contacts the display screen, the blocking region is large and the corresponding touch area is large.

In a scenario where touch data is applied to respond to the writing process, the writing interface can be displayed on the display screen first. The writing interface can cover the display screen as a whole, and the display range of the writing interface in the display screen can be adjusted through roaming, zooming and other operations. The writing interface can cover the display screen as a whole, and its size and a relative position with the display screen remain unchanged. The writing interface can further be displayed with a display control, which is configured to interactively control the writing content or the writing interface during the writing process. The writing interface may be displayed after detecting that an application icon corresponding to a writing application is triggered. For example, a plurality of application icons is displayed in the interactive white board, including the application icon corresponding to the "electronic whiteboard." When a triggering operation acting on the application icon is detected, an application window of the "electronic whiteboard" is displayed. The application window can be a writing interface, and the display range of the writing interface can be dynamically adjusted according to an operation. Another example is that a document is currently being displayed on the interactive white board, and interactive controls at a system level, such as annotation controls and return-to-desktop controls, are being displayed on the top. When a triggering operation acting on the annotation control is detected, an annotation page is displayed on the top layer of the currently displayed document. The annotation page can be a writing interface, and the display range and display scale of the writing interface can be statically fixed.

By taking the writing interface corresponding to the "electronic whiteboard" as an example, the touch operation that can be responded may include triggering the display control in the writing interface and operating the writing content in the writing interface. For the triggering of display controls, such as creating a new page and closing a page, accurate operation can usually be carried out, the interactive white board can receive accurate control triggering information and switch the screen in response to the triggering of the control. The operations of writing contents are mainly writing operations and erasing operations. The writing operation is used to add handwriting on the writing interface according to the touch operation data corresponding to the writing operation. The erasing operation is used to delete an existing handwriting according to the touch operation data corresponding to the erasing operation on the writing interface. In a writing process of a physical blackboard, a contact area between a chalk and a blackboard is small during writing, and a contact area between a blackboard eraser and the blackboard is large during erasing. In order to adapt writing habits of the physical blackboard. In the interactive white board, the writing operation and erasing operation are generally distinguished by the touch area, that is, when the interactive white board detects a contact point with a small touch area on the writing interface, it is confirmed that the contact point is a writing contact point (the corresponding touch operation is defined as a first touch operation in the embodiment of the present disclosure). When a contact point with a large touch area is detected, it is confirmed that the contact point is an erasing contact point (the corresponding touch operation is defined as a second touch operation in the embodiment of the present disclosure). During the writing, handwriting is generated at a corresponding touch position by following the movement of the writing contact point. During the erasing, a graphic identifier of an eraser is displayed when the erasing contact point is detected, the graphic identifier moves along with the movement of the erasing contact point, and the handwriting in the coverage region during the movement of the graphic identifier is deleted.

Figure 2:
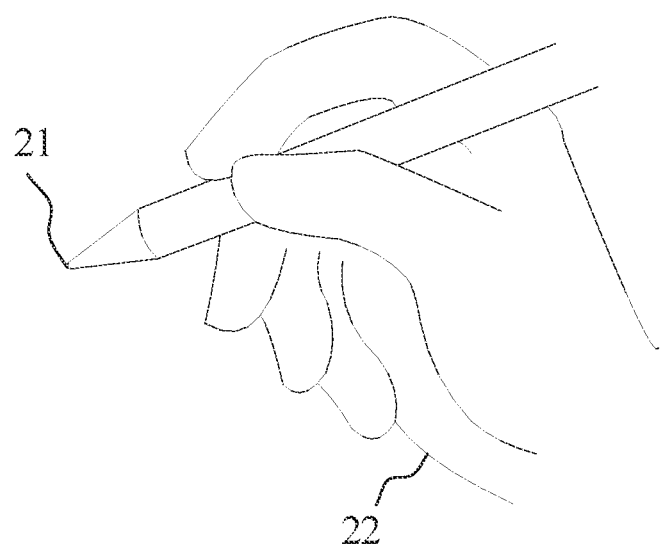
FIG. 2 is a schematic diagram of a state of a hand during writing.
Figure 3:
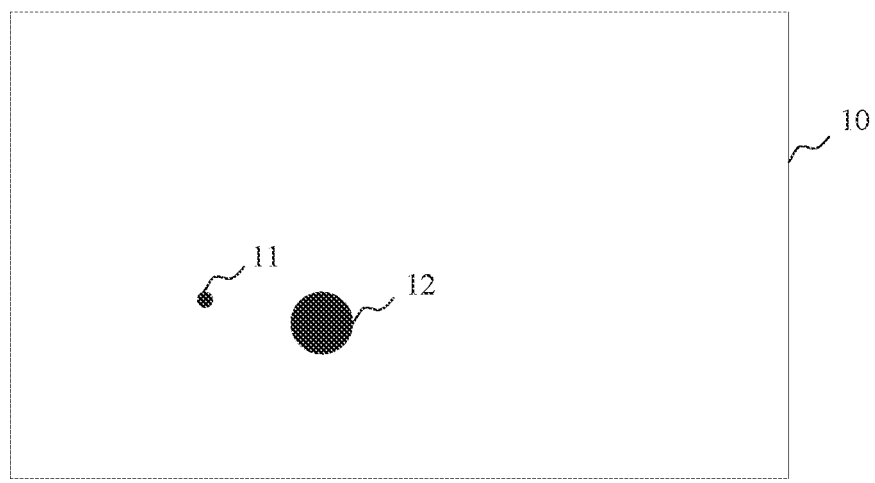
FIG. 3 is a schematic diagram of a contact point of a palm during writing.

If there is no false touch, the writing mode or erasing mode can be entered according to the touch area, and the writing operation or erasing operation can be completed correspondingly. However, during actual operation, the user's clothing, writing posture, etc. may lead to false touch. FIG. 2 is a schematic diagram of a hand state during writing. When a user writes on the interactive white board in this posture, the handwriting input is performed by a touch pen 21. During a process of the handwriting input, a palm 22 of the user may approach or contact the interactive white board, thereby generating new contact points. That is, as shown in FIG. 3, a writing contact point 11 corresponding to a first touch operation and an erasing contact point 12 corresponding to a second touch operation are simultaneously detected on the writing interface 10. The presence of a plurality of contact points may cause a disturbance in the response of the writing operation. Therefore, in some implementations of the present disclosure, the writing operation or erasing operation is not performed correspondingly when the writing contact point or erasing contact point is detected. Instead, in consideration of the user's writing habits, the touch operation data corresponding to the contact point is comprehensively determined through subsequent steps so as to achieve accurate response, thereby avoiding the content in the writing interface from changing beyond an actual expected input due to an error operation in the writing process. It should be noted that the circular writing contact point 11 and the erasing contact point 12 in FIG. 3 are only a schematic shape and size relationship, and do not limit to the actual shape of the contact point.

Generally, the touch operation with a touch area not greater than a preset area threshold is the first touch operation, and the touch operation with a touch area greater than the preset area threshold is the second touch operation. In some implementations, in some writing demands, there may be different settings, such as large-area color graffiti, input of thicker fonts, etc. The interactive white board at this time may set a large writing contact according to the operation, and when receiving a contact point with a corresponding size, recognize it as a writing contact point to carry out the writing operation.

After acquiring the touch operation data generated based on the touch operation, a corresponding response is made in the writing mode or the erasing mode according to the sequential state of the touch operation and the previous moving distance of different touch operations. Reference is made to Steps S120-160 for the response process.

In some implementations, it may be a processing cycle from appearance of a contact point to disappearance of all contact points. For example, in the writing process of Chinese character "(human)," in the case of no joined-up writing, two corresponding strokes need two operations to complete, and each stroke can execute the processing process in this solution once.

Step S120: when the first touch operation is received first, entering a writing mode.

For the interactive white board, if the touch operation data is generated based on one touch operation, it will respond to the unique touch operation. When the unique touch operation is confirmed as the first touch operation (i.e., writing operation) according to the touch area, the interactive white board enters the writing mode is correspondingly.

Step S130: when the first touch operation is received first and the second touch operation starts to be received during a touch process of the first touch operation, maintaining the writing mode.

When the touch operation data is generated based on the first touch operation and the second touch operation, and the first one detected among the plurality of touch operations is the first touch operation (i.e., the writing operation), the first touch operation has the highest priority during its existence period, and is a valid touch operation that must be responded to. Even if other touch operations are detected during the existence period of the first touch operation, it is still necessary to maintain the response to the first touch operation in the writing mode, that is, it maintains adding handwriting on the writing interface according to the touch operation data corresponding to the first touch operation.

Step S140: when the second touch operation is received first, entering an erasing mode.

For the interactive white board, in the process of receiving the touch operation, there may be only one touch operation that generates corresponding touch operation data at the beginning, and a response is made to the unique touch operation. When the unique touch operation is confirmed as the second touch operation (i.e., erase operation) according to the touch area, the erase mode is entered correspondingly.

Step S150: after the second touch operation is received first and the erasing mode is entered, starting to receive the first touch operation during a touch process of the second touch operation, and when a moving distance of the second touch operation from an initial time of receiving the second touch operation to an initial time of receiving the first touch operation is not greater than a first distance threshold, performing mode switching to enter the writing mode from the erasing mode.

After receiving only the second touch operation at the beginning and entering the erasing mode, the first touch operation may be received very soon, that is, if the moving distance of the second touch operation before the initial time of the first touch operation is within the first distance threshold, at this time, it can be considered that the actual touch operation demand is not erasing, but writing, and the initial second touch operation is only an error operation caused by the user's sleeves or personal writing habits. The mode is switched correspondingly to enter the writing mode from the erasing mode.

Step S160: after the second touch operation is received first and the erase mode is entered, starting to receive the first touch operation during the touch process of receiving the second touch operation, and when the moving distance of the second touch operation from the initial time of receiving the second touch operation to the initial time of receiving the first touch operation is greater than the first distance threshold, maintaining the erasing mode.

After receiving only the second touch operation at the beginning and entering the erasing mode, the first touch operation may be received after a certain operation amplitude being performed, that is, if the moving distance of the second touch operation is greater than the first distance threshold before the initial time of the first touch operation, at this time, it can be considered that the actual touch operation demand is erasing, and the subsequent received second touch operation is an error operation in the erasing process, thereby continuing to maintain the erase mode.

The implementation process, corresponding to the erasing mode, may further include Step S170 (not shown), and Step S170 implements a screen updating process in the erasing mode.

Step S170: in the erasing mode, erasing a corresponding handwriting according to touch operation data generated based on the second touch operation, and ignoring the first touch operation.

In the erasing mode, there may be only the second touch operation, or there may be the second touch operation and the first touch operation at the same time, but the first touch operation is not responded to. In this mode, the corresponding handwriting is erased according to touch operation data generated based on the second touch operation, and no response is made to other touch operations. The erasing process has been described above.

Corresponding to Step S170, Step S150 may further include Step S151 (not shown) to realize the restoration of the screen in the case of erroneous erasure.

Step S151: restoring the handwriting erased in the erasing mode.

Corresponding to a touch operation state described in Step S150, when switching from the erasing mode to the writing mode, the handwriting erased due to the previous error operation of the second touch operation is restored correspondingly.

The implementation process, corresponding to the writing mode, may further include Step S180 (not shown), and Step S180 implements the screen update process in the writing mode.

Step S180: in the writing mode, adding handwriting according to touch operation data generated based on the first touch operation, and ignoring the second touch operation.

In the writing mode, there may be only the first touch operation, or there may be the first touch operation and the second touch operation at the same time, but the second touch operation is not responded to. In this mode, the corresponding handwriting is added according to the touch operation data generated based on the first touch operation, and no response is made to other touch operations. The writing process has been described above.

In some implementations, there may be a third touch operation simultaneously in addition to the second touch operation. For the third touch operation, Step S180 further includes Steps S181-S183 (not shown) to realize a response to the third touch operation during the writing process.

Step S181: acquiring touch operation data generated based on a third touch operation in the writing mode. An initial time of the third touch operation is later than an initial time of a current first touch operation and an initial time of the second touch operation.

In the writing mode, in addition to the first touch operation and the second touch operation, the touch operation received simultaneously may further include a third touch operation that is received after the first touch operation and the second touch operation. Different touch operation data of the third touch operation may correspond to different response processes.

Step S182: when the third touch operation satisfies a preset writing response condition, adding handwriting according to touch operation data generated based on the third touch operation, wherein the writing response condition is that: a touch area of the third touch operation is not greater than a preset area threshold, and a distance between the third touch operation at the initial time and the second touch operation at the same time is greater than a second distance threshold.

In the writing process based on the interactive white board, for a user, there is generally only one touch target at the same time. However, in the actual touch detection process, there may be excessive contact with the interactive white board due to personal writing habits or clothing, which makes the interactive white board detect multiple touch operations, that is, there are unstable and redundant touch operations in addition to the normal and stable first touch operations. For these touch operations, it can be considered that another writing operation when multiple people write is a valid touch operation. The valid touch operation is the third touch operation that meets the preset writing response conditions, and its touch area needs to be not greater than the preset area threshold. Moreover, when multiple people write, the writing operation of a second person is far enough from the second touch operation detected during the writing process of another person, that is, the distance from the second touch operation at the same time is greater than the second distance threshold, and the area and distance requirements are all satisfied. That is, it is confirmed that the writing response conditions are met, and the third touch operation is responded to and the handwriting is added correspondingly.

Step S183: when the third touch operation does not meet the writing response condition, ignoring the third touch operation.

When the touch area of the third touch operation is greater than the preset area threshold, that is, the third touch operation is equivalent to the erase operation, or when the distance between the third touch operation at the initial time and the second touch operation at the same time is not greater than the second distance threshold, that is, the third touch operation is a writing operation, but the distance between the third touch operation and the second touch operation is close, it is regarded as an error operation and should not be responded to, and the third touch operation should be ignored correspondingly.

In some implementations, if only the first touch operation is detected, or the first touch operation and the second touch operation are detected in the writing mode, correspondingly, only the first touch operation is responded to, that is, it is performed normally as described in Step S180.

For a rapid writing process mentioned above, a quick response to the rapid writing can be realized through Step S190 (not shown).

Step S190: when a fourth touch operation is detected within a preset duration after the touch operation is completed, maintaining the writing mode.

For the rapid and continuous writing process, there may be frequent operations of lifting and dropping the pen, and correspondingly, the number of error operations will be more during dropping the pen. At this time, pen-dropping is mostly to continue an input of the next text or graphics. If the type of writing operation is determined every time of dropping the pen, then when the palm contacts the display screen before the pen tip, the erasing contact point is detected and a graphic identification of an eraser is displayed correspondingly. Then, when the writing contact point corresponding to the pen tip contact is detected, the display of the graphic identification is canceled and the handwriting is updated, which will cause the flashing of the eraser during the stroke switching in the rapid writing process, leading to interference to the rapid writing process of the user. According to time determination in Step S190, if an interval between initial time of the current touch operation and end time of the latest writing is short (that is, the fourth touch operation is detected within a preset duration after the end of the touch operation), the writing mode is just maintained regardless of the type of the current touch operation. If the fourth touch operation is a writing operation, correspondingly, handwriting is directly added in the writing mode. If the fourth touch operation is an erase operation, the touch operation is ignored in the writing mode. This data processing mechanism corresponds to an actual writing operation target at the time of writing, that is, the high-frequency writing operation meeting the time interval requirements is directly responded to as the input of handwriting. In some implementations, the preset duration is an empirical value according to the statistics of writing habits. For example, in the continuous writing process, the time interval between two adjacent strokes may be less than 0.5 seconds, and the preset duration is correspondingly set to 0.5 seconds. In some implementations, it can be set more accurately according to statistics, such as 0.45 seconds or 0.55 seconds.

Figure 4:
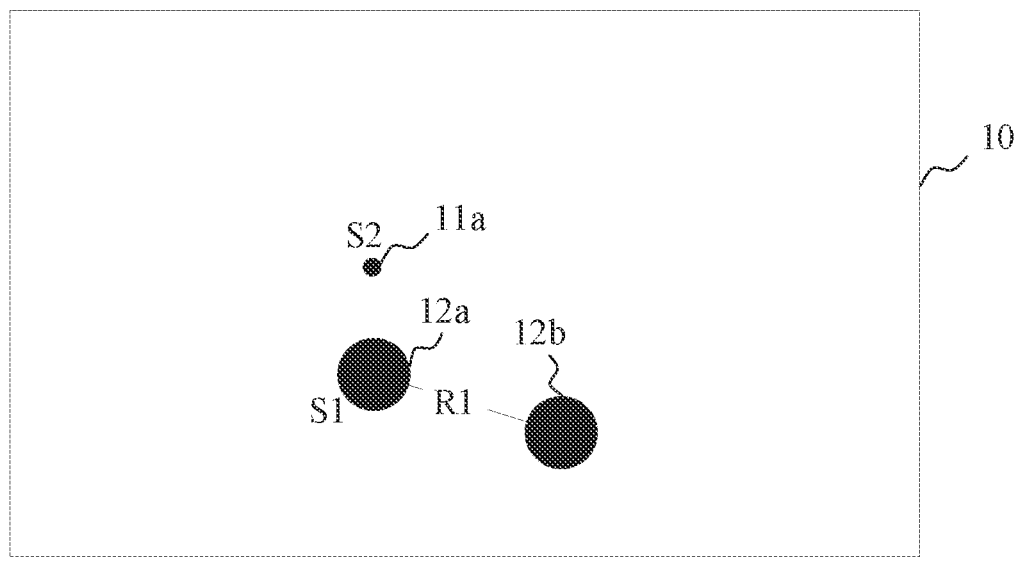
FIG. 4 is a schematic diagram of combination of different contact points.

Referring to FIG. 4, FIG. 4 is a schematic diagram of a combination of multiple contact points detected in one writing operation. Therein, according to a touch area S1, a contact point 12a is confirmed as a contact point corresponding to the second touch operation, which is the contact point detected firstly. That is, the touch operation detected firstly is the second touch operation, and Step S140 is executed at this time. A response state of the first touch operation detected during the continuous process of the second touch operation is confirmed according to the moving distance of the contact point 12a corresponding to the second touch operation before the first touch operation is detected. In this solution, if the contact point 12a has not changed significantly (i.e., the moving distance is not greater than the first distance threshold), that is, a new touch operation is detected, then the new touch operation corresponding to the contact point 11a is confirmed as the first touch operation according to the touch area S2, and Step S150 is executed at this time. If the contact point 12a has moved to the contact point 12b, that is, the moving distance of the second touch operation has reached R1 and exceeded the first distance threshold when the contact point 11a is detected, then according to the touch area S2 of the contact point 11a, the new touch operation corresponding to the contact point 11a is confirmed as the first touch operation, and Step S160 is executed at this time.

Figure 5:
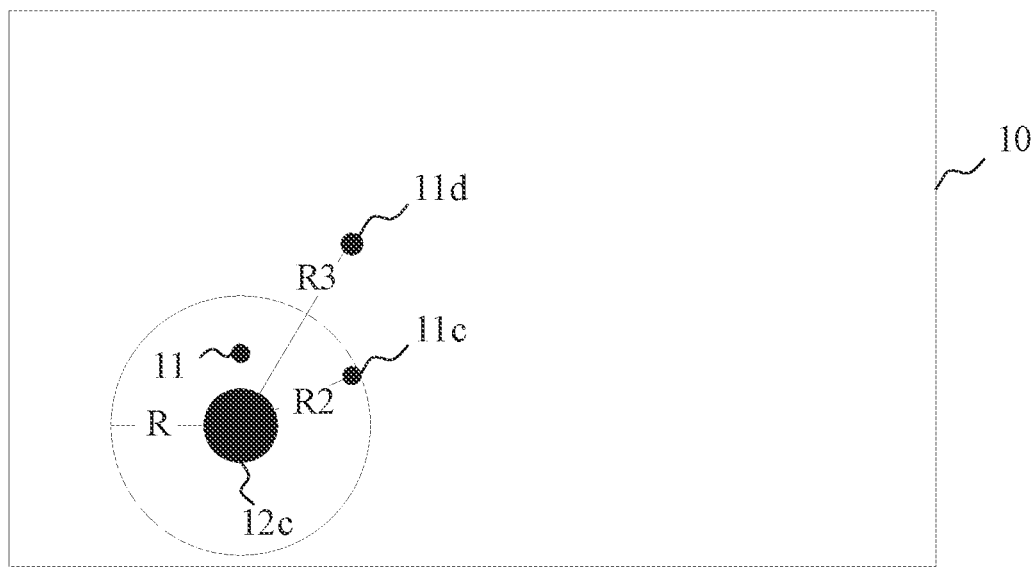
FIG. 5 is a schematic diagram of a plurality of writing contact points.

As shown in FIG. 5, the contact point 11 is the first contact point detected in the process of receiving the touch operation, and corresponds to the first touch operation, and Step S120 is executed at this time. If a contact point 12c is detected during a continuous process of a first touch operation, it is possible to confirm the presence of the second touch operation correspondingly, but the response state of the first touch operation is not affected, and Step S130 is executed at this time. After the contact point 11 and the contact point 12c are sequentially detected, if the contact point 11c is detected, it is possible to confirm the presence of the third touch operation correspondingly. According to the contact point 11c, it is confirmed that the touch area corresponding to the third touch operation is not greater than the preset area threshold, and the distance R2 from the second touch operation is not greater than the second distance threshold. Therefore, the third touch operation corresponding to the contact point 11c does not meet the writing response condition, and Step S183 is executed at this time. After the contact point 11 and the contact point 12c are sequentially detected, if a contact point 11d is detected, it is possible to confirm the presence of the third touch operation correspondingly. According to the contact point 11d, it is confirmed that the touch area corresponding to the third touch operation is not greater than the preset area threshold and a distance R3 from the second touch operation is greater than the second distance threshold, therefore the third touch operation corresponding to the contact point 11d meets the writing response condition, and Step S182 is executed at this time. The first distance threshold, the second distance threshold and the preset area threshold in this solution can be expressed in pixels in the writing interface. In some implementations, a distance between the contact points can be described in integer numbers, and in some implementations, it can also be defined as a decimal number, which can avoid the situation that the actual distance is equal to the corresponding threshold. In some implementations, each threshold can also be defined to a state, and when the distance is equal to the threshold, it belongs to a corresponding state.

According to the above-mentioned method, a process of performing touch operation includes: receiving touch operation and acquiring touch operation data generated based on a current touch operation, wherein the current touch operation includes a first touch operation and a second touch operation, the touch operation data includes a touch area, the touch area of the first touch operation is not greater than a preset area threshold, and the touch area of the second touch operation is greater than the preset area threshold; when the first touch operation is received first, entering a writing mode; when the first touch operation is received first and the second touch operation starts to be received during a touch process of the first touch operation, maintaining the writing mode; when the second touch operation is received first, entering an erasing mode; after the second touch operation is received first and the erasing mode is entered, starting to receive the first touch operation during a touch process of the second touch operation, and when a moving distance of the second touch operation from an initial time of receiving the second touch operation to an initial time of receiving the first touch operation is not greater than a first distance threshold, performing mode switching to enter the writing mode from the erasing mode; and after the second touch operation is received first and the erase mode is entered, starting to receive the first touch operation during the touch process of receiving the second touch operation, and when the moving distance of the second touch operation from the initial time of receiving the second touch operation to the initial time of receiving the first touch operation is greater than the first distance threshold, maintaining the erasing mode. When the two touch points of the first touch operation and the second touch operation are detected on the writing operation interface based on the infrared touch, the valid touch point in the two touch points is confirmed according to the touch operation data, and the touch operation data corresponding to the invalid touch point is discarded. According to the touch operation data corresponding to the valid touch point, the above solution can update a sequence relationship between the two touch operations on the display screen in the writing interface, confirm a valid touch operation and an invalid touch operation in the two touch operations, maintain or switch to the corresponding mode according to the valid touch operation, and ignore the touch operation data corresponding to the invalid touch operation, which realizes an accurate response to the writing process, and reduces a display interference of error operation to the writing process.

Figure 6:
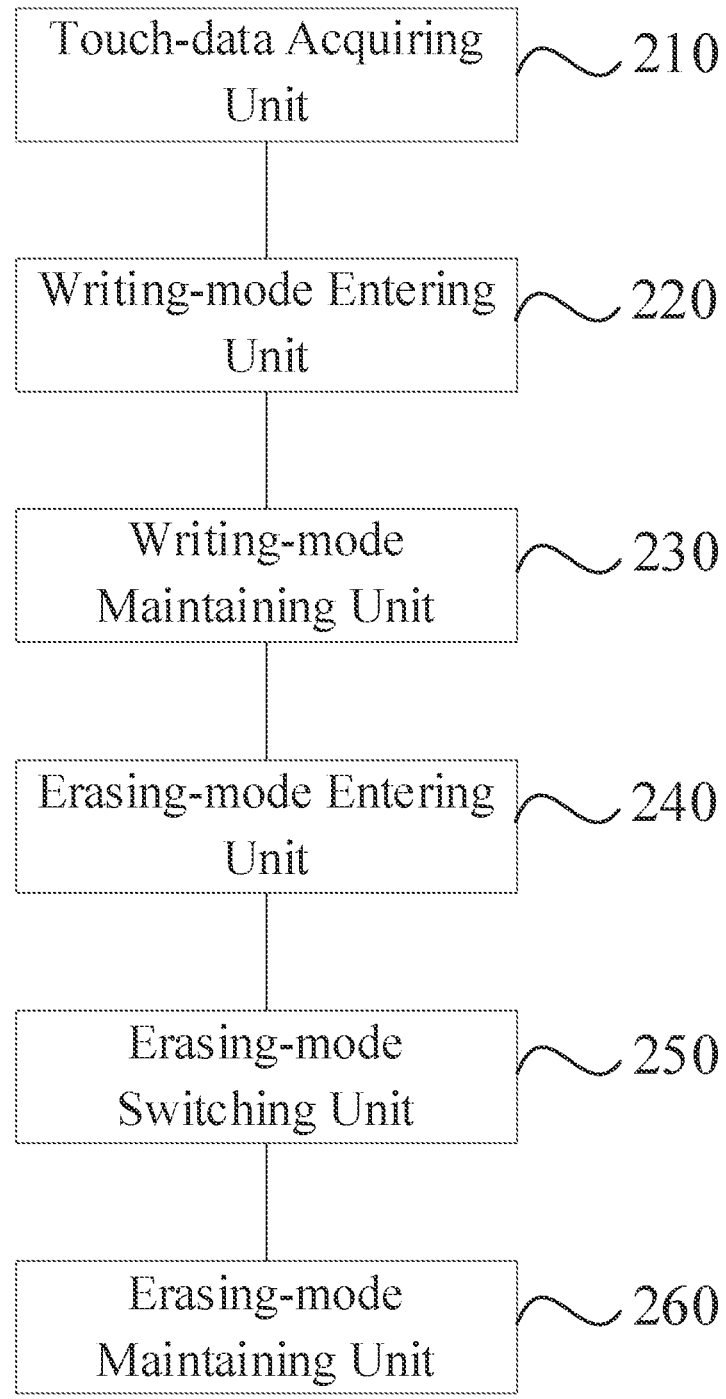
FIG. 6 is a schematic diagram of a structure of a touch response device according to an embodiment of the present disclosure.

FIG. 6 is a schematic diagram of a structure of a touch response device according to an embodiment of the present disclosure. Referring to FIG. 6, the touch response device is applied to a terminal. And the touch response device includes: a touch-data acquiring unit 210, a writing-mode entering unit 220, a writing-mode maintaining unit 230, an erasing-mode entering unit 240, an erasing-mode switching unit 250 and an erasing-mode maintaining unit 260.

Thereinto, the touch-data acquiring unit 210 is configured to receive a touch operation and acquire touch operation data generated based on a current touch operation, wherein the current touch operation includes a first touch operation and a second touch operation, the touch operation data includes a touch area, the touch area of the first touch operation is not greater than a preset area threshold, and the touch area of the second touch operation is greater than the preset area threshold. The writing-mode entering unit 220 is configured to, when the first touch operation is received first, enter a writing mode. The writing-mode maintaining unit 230 is configured to, when the first touch operation is received first and the second touch operation starts to be received during a touch process of the first touch operation, maintain the writing mode. The erasing-mode entering unit 240 is configured to, when the second touch operation is received first, enter an erasing mode. The erasing-mode switching unit 250 is configured to, after the second touch operation is received first and the erasing mode is entered, start to receive the first touch operation during a touch process of the second touch operation, and when a moving distance of the second touch operation from an initial time of receiving the second touch operation to an initial time of receiving the first touch operation is not greater than a first distance threshold, perform mode switching to enter the writing mode from the erasing mode. The erasing-mode maintaining unit 260 is configured to, after the second touch operation is received first and the erase mode is entered, start to receive the first touch operation during the touch process of receiving the second touch operation, and when the moving distance of the second touch operation from the initial time of receiving the second touch operation to the initial time of receiving the first touch operation is greater than the first distance threshold, maintain the erasing mode.

On the basis of the above embodiments, the touch response device further includes:

a handwriting erasing unit, configured to, in the erasing mode, erase a corresponding handwriting according to the touch operation data generated based on the second touch operation, and ignore the first touch operation.

On the basis of the above embodiments, the erasing-mode switching unit 250 include:

a handwriting restoring module, configured to restore the handwriting erased in the erasing mode.

On the basis of the above embodiments, the touch response device further includes:

a handwriting adding unit, configured to, in the writing mode, add the handwriting according to touch operation data generated based on the first touch operation, and ignore the second touch operation.

On the basis of the above embodiments, the handwriting adding unit includes:

a third operation acquiring module, configured to acquire touch operation data generated based on a third touch operation in the writing mode, wherein an initial time of the third touch operation is later than an initial time of a current first touch operation and an initial time of the second touch operation;

a third operation responding module, configured to, when the third touch operation satisfies a preset writing response condition, add handwriting according to touch operation data generated based on the third touch operation, wherein the writing response condition is that a touch area of the third touch operation is not greater than a preset area threshold, and a distance between the third touch operation at the initial time and the second touch operation at the same time is greater than a second distance threshold; and a third operation clearing module, configured to, when the third touch operation does not meet the writing response condition, ignore the third touch operation.

On the basis of the above embodiments, the touch response device further includes:

a continuous-writing maintaining unit, configured to, when a fourth touch operation is detected within a preset duration after the touch operation is completed, maintain the writing mode.

The touch response device provided in the embodiment of the present disclosure is included in a terminal device, and can be used to perform any of the touch response methods provided in the above embodiments, and has corresponding functions and beneficial effects.

It is worth noting that in the above embodiment of the touch response device, the units and modules included are only divided according to the functional logic, but are not limited to the above division, as long as the corresponding functions can be realized. In addition, the specific names of the functional units are only for convenience of mutual discrimination and are not intended to limit the claimed scope of the present disclosure.

Figure 7:
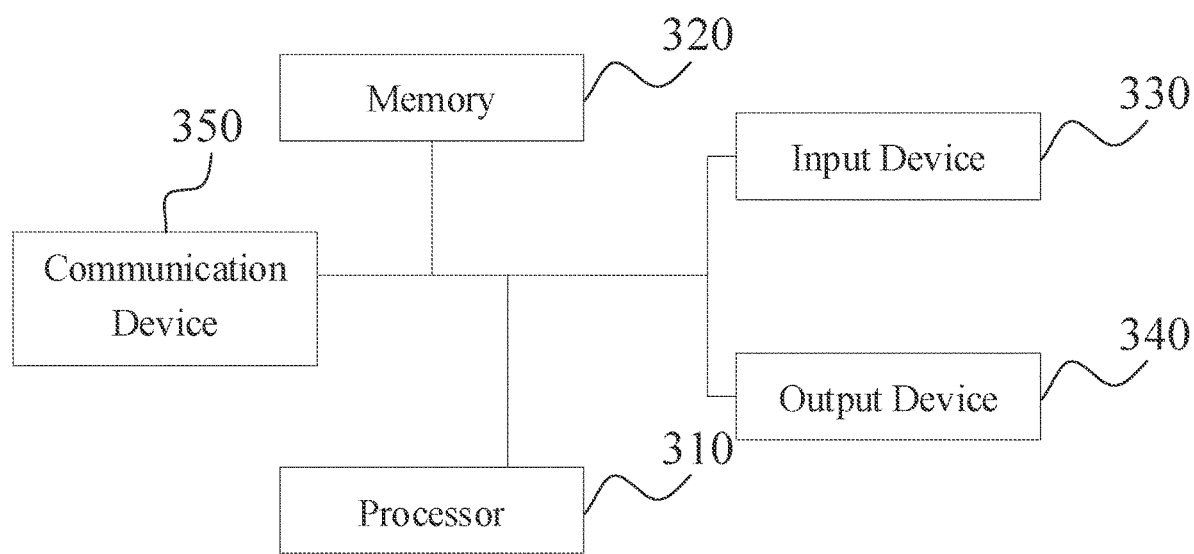
FIG. 7 is a schematic diagram of a structure of an interactive white board according to an embodiment of the present disclosure.

FIG. 7 is a schematic diagram of a structure of an interactive white board according to an embodiment of the present disclosure. As shown in FIG. 7, the interactive white board includes a processor 310, a memory 320, an input device 330, an output device 340 and a communication device 350. The number of processors 310 in the interactive white board may be one or more. In FIG. 7, one processor 310 is taken as an example. The processor 310, the memory 320, the input device 330, the output device 340, and the communication device 350 in the interactive white board may be connected through a bus or other means. In FIG. 7, the connection through a bus is taken as an example.

The memory 320 is a computer-readable storage medium for storing software programs, computer executable programs and modules, such as program instructions/modules corresponding to the touch response method in the embodiment of the present disclosure (for example, the touch-data acquiring unit 210, the writing-mode entering unit 220, the writing-mode maintaining unit 230, the erasing-mode entering unit 240, the erasing-mode switching unit 250 and the erasing-mode maintaining unit 260 in the touch response device). The processor 310 executes various functional applications and data processing of the interactive white board by running software programs, instructions and modules stored in the memory 320, and realizes the above described touch response method.

The memory 320 may include a program storage area and a data storage area, wherein the program storage area may store an operating system and an application program required for at least one function. The data storage area may store data and the like created according to the use of the touch response device. In addition, the memory 320 may include a high-speed random access memory, and may further include a nonvolatile memory, such as at least one disk storage device, a flash memory device, or other non-volatile solid-state storage device. In some examples, the memory 320 may further include memory remotely disposed relative to the processor 310, which may be connected to the touch response device via a network. Examples of the above networks include, but are not limited to, the Internet, an enterprise intranet, a local area network, a mobile communication network, and combinations thereof.

The input device 330 may be configured to receive input digital or character information and generate key signal inputs related to user settings and function control of the touch response device. The output device 340 may include a display device such as a display screen.

The above interactive white board includes a touch response device, which can be configured to execute any touch response method, and has corresponding functions and beneficial effects.

An embodiment of the present disclosure further provides a computer-readable storage medium, on which a computer program is stored. When the computer program executed by a processor, the computer program is used to perform relevant operations in the touch response method provided in any embodiment of the present disclosure, and has corresponding functions and beneficial effects.

Those skilled in the art should understand that the embodiments of the present disclosure can be provided as a method, a system, or a computer program product.

Therefore, the present disclosure may adopt the form of a complete hardware embodiment, a complete software embodiment, or an embodiment combining software and hardware. Moreover, the present disclosure may adopt the form of a computer program product implemented on one or more computer-usable storage media (which may include but not limited to disk storage, CD-ROM, optical storage, etc.) containing computer-usable program codes. The present disclosure is described with reference to flowcharts and/or block diagrams of methods, devices (systems), and computer program products in embodiments of the present disclosure. It should be understood that each process and/or block in the flowchart and/or block diagram, and the combination of processes and/or blocks in the flowchart and/or block diagram can be implemented by computer program instructions. These computer program instructions can be provided to the processor of a general-purpose computer, a special-purpose computer, an embedded processor, or other programmable data processing equipment to generate a machine, so that with the instructions executed by the processor of the computer or other programmable data processing equipment, a device that is used to implement the functions specified in one process or multiple processes in the flowchart and/or one block or multiple blocks in the block diagram is generated. These computer program instructions can also be stored in a computer-readable memory that can direct a computer or other programmable data processing equipment to work in a specific manner, so that the instructions stored in the computer-readable memory produce an article of manufacture including the instruction device. The instruction device implements the functions specified in one process or multiple processes in the flowchart and/or one block or multiple blocks in the block diagram. These computer program instructions can also be loaded on a computer or other programmable data processing equipment, so that a series of operation steps are executed on the computer or other programmable equipment to produce computer-implemented processing, thus the instructions executed on the computer or other programmable equipment provide steps for implementing functions specified in a flow or multiple flows in the flowchart and/or a block or multiple blocks in the block diagram.

In a typical configuration, the computing device includes one or more processors (e.g., Central Processing Units (CPUs)), input/output interfaces, network interfaces, and memory. The memory may include non-permanent memory, Random Access Memory (RAM) and/or non-volatile memory, etc. in a computer-readable medium, such as Read-Only Memory (ROM) or flash memory (flash RAM). The memory is an example of a computer-readable medium.

Computer-readable storage media include permanent and non-permanent, removable and non-removable media, and information storage can be achieved by any method or technology. The information can be computer-readable instructions, data structures, program modules, or other data. Examples of computer-readable storage media include, but are not limited to: Phase-change Random Access Memory (PRAM), Static Random Access Memory (SRAM), Dynamic Random Access Memory (DRAM), other types of Random Access Memory (RAM), Read-Only Memory (ROM), Electrically Erasable Programmable Read-Only Memory (EEPROM), flash memory or other memories, Compact Disc Read-Only Memory (CD-ROM), Digital Versatile Disc (DVD) or other optical storage, magnetic cassette tape, magnetic disk storage or other magnetic storage devices or any other non-transmission media which can be used to store information capable of being accessed by computing devices. According to the definition in the present disclosure, computer-readable media does not include transitory media, such as modulated data signals and carrier waves.

It should also be noted that the terms "include," "comprise" or any other variants thereof are intended to cover non-exclusive inclusion, so that a process, method, commodity or equipment including a series of elements not only includes those elements, but also includes other elements that are not explicitly listed, or also include elements inherent to such processes, methods, commodities, or equipment. If there are no more restrictions, the element defined by the sentence "including a . . . " does not exclude the existence of other identical elements in the process, method, commodity, or equipment that includes the element.

It should be noted that the above is only some embodiments of the present disclosure and the applied technical principle. Those skilled in the art will understand that the present disclosure is not limited to the specific embodiments described herein, and it is possible for those skilled in the art to make various obvious changes, readjustments and substitutions without departing from the claimed scope of the present disclosure. Therefore, although the present disclosure has been described in more detail through the above embodiments, the present disclosure is not limited to the above embodiments, and may include more equivalent embodiments without departing from the inventive concept. The scope of the present disclosure is determined by the scope of the appended claims.

What is claimed is:

1. A touch response method, comprising:
receiving one or more touch operations and acquiring touch operation data generated based on a current touch operation,
wherein the current touch operation comprises a first touch operation and a second touch operation,
wherein the touch operation data comprises a touch area, the touch area of the first touch operation is not greater than a preset area threshold, and the touch area of the second touch operation is greater than the preset area threshold, and
wherein the method further comprises one or more of the following:
when the first touch operation is received first, entering a writing mode;
when the first touch operation is received first and the second touch operation starts to be received during a touch process of the first touch operation, maintaining the writing mode;
when the second touch operation is received first, entering an erasing mode;
after the second touch operation is received first and the erasing mode is entered, starting to receive the first touch operation during a touch process of the second touch operation, and when a moving distance of the second touch operation from an initial time of receiving the second touch operation to an initial time of receiving the first touch operation is not greater than a first distance threshold, performing mode switching to enter the writing mode from the erasing mode; and
after the second touch operation is received first and the erase mode is entered, starting to receive the first touch operation during the touch process of the second touch operation, and when the moving distance of the second touch operation from the initial time of receiving the second touch operation to the initial time of receiving the first touch operation is greater than the first distance threshold, maintaining the erasing mode.

2. The touch response method according to claim 1, further comprising:
in the erasing mode, erasing a corresponding handwriting according to touch operation data generated based on the second touch operation, and ignoring the first touch operation.

3. The touch response method according to claim 2, wherein after the second touch operation is received first and the erasing mode is entered, starting to receive the first touch operation during the touch process of the second touch operation, and when the moving distance of the second touch operation from the initial time of receiving the second touch operation to the initial time of receiving the first touch operation is not greater than the first distance threshold, performing mode switching to enter the writing mode from the erasing mode comprises:
restoring handwriting erased in the erasing mode.

4. The touch response method according to claim 1, further comprising:
adding, in the writing mode, handwriting according to the touch operation data generated based on the first touch operation, and ignoring the second touch operation.

5. The touch response method according to claim 4, wherein adding, in the writing mode, the handwriting according to the touch operation data generated based on the first touch operation and ignoring the second touch operation comprises:
acquiring, in the writing mode, touch operation data generated based on a third touch operation, wherein an initial time of receiving the third touch operation is later than the initial time of receiving the first touch operation and the initial time of receiving the second touch operation, wherein
when the third touch operation meets a preset writing response condition, adding handwriting according to the touch operation data generated based on the third touch operation, or
when the third touch operation does not meet the preset writing response condition, ignoring the third touch operation, and
wherein the preset writing response condition is that a touch area of the third touch operation is not greater than the preset area threshold, and a distance between the third touch operation at the initial time and the second touch operation at the same time is greater than a second distance threshold.

6. The touch response method according to claim 4, wherein after adding, in the writing mode, the handwriting according to the touch operation data generated based on the first touch operation and ignoring the second touch operation, the method further comprises:
when a fourth touch operation is detected within a preset duration after the touch operation is completed, maintaining the writing mode.

7. An interactive white board, comprising:
a memory storing computer-readable instructions; and
a processor coupled to the memory and configured to execute the computer-readable instructions, wherein the computer-readable instructions, when executed by the processor, cause the processor to perform operations comprising:
receiving one or more touch operations and acquiring touch operation data generated based on a current touch operation,
wherein the current touch operation comprises a first touch operation and a second touch operation,
wherein the touch operation data comprises a touch area, the touch area of the first touch operation is not greater than a preset area threshold, and the touch area of the second touch operation is greater than the preset area threshold and
wherein the operations further comprise one or more of the following:
when the first touch operation is received first, entering a writing mode;
when the first touch operation is received first and the second touch operation starts to be received during a touch process of the first touch operation, maintaining the writing mode;
when the second touch operation is received first, entering an erasing mode;
after the second touch operation is received first and the erasing mode is entered, starting to receive the first touch operation during a touch process of the second touch operation, and when a moving distance of the second touch operation from an initial time of receiving the second touch operation to an initial time of receiving the first touch operation is not greater than a first distance threshold, performing mode switching to enter the writing mode from the erasing mode; and
after the second touch operation is received first and the erase mode is entered, starting to receive the first touch operation during the touch process of the second touch operation, and when the moving distance of the second touch operation from the initial time of receiving the second touch operation to the initial time of receiving the first touch operation is greater than the first distance threshold, maintaining the erasing mode.

8. The interactive white board according to claim 7, wherein the operations further comprise:
   in the erasing mode, erasing a corresponding handwriting according to touch operation data generated based on the second touch operation, and ignoring the first touch operation.

9. The interactive white board according to claim 8, wherein after the second touch operation is received first and the erasing mode is entered, starting to receive the first touch operation during the touch process of the second touch operation, and when the moving distance of the second touch operation from the initial time of receiving the second touch operation to the initial time of receiving the first touch operation is not greater than the first distance threshold, performing mode switching to enter the writing mode from the erasing mode comprises:
   restoring handwriting erased in the erasing mode.

10. The interactive white board according to claim 7, wherein the operations further comprise:
    adding, in the writing mode, handwriting according to the touch operation data generated based on the first touch operation, and ignoring the second touch operation.

11. The interactive white board according to claim 10, wherein adding, in the writing mode, the handwriting according to the touch operation data generated based on the first touch operation and ignoring the second touch operation comprises:
    acquiring, in the writing mode, touch operation data generated based on a third touch operation, wherein an initial time of receiving the third touch operation is later than the initial time of receiving the first touch operation and the initial time of receiving the second touch operation, wherein
       when the third touch operation meets a preset writing response condition, adding handwriting according to the touch operation data generated based on the third touch operation, or
       when the third touch operation does not meet the preset writing response condition, ignoring the third touch operation, and
    wherein the preset writing response condition is that a touch area of the third touch operation is not greater than the preset area threshold, and a distance between the third touch operation at the initial time and the second touch operation at the same time is greater than a second distance threshold.

12. The interactive white board according to claim 10, wherein after adding, in the writing mode, the handwriting according to the touch operation data generated based on the first touch operation and ignoring the second touch operation, the operations further comprise:
    when a fourth touch operation is detected within a preset duration after the touch operation is completed, maintaining the writing mode.

13. A non-transitory computer-readable medium storing instructions that, when executed by a processor, cause the processor to perform operations comprising:
    receiving one or more touch operations and acquiring touch operation data generated based on a current touch operation,
    wherein the current touch operation comprises a first touch operation and a second touch operation,
    wherein the touch operation data comprises a touch area, the touch area of the first touch operation is not greater than a preset area threshold, and the touch area of the second touch operation is greater than the preset area threshold, and
    wherein the operations further comprise one or more of the following:
       when the first touch operation is received first, entering a writing mode;
       when the first touch operation is received first and the second touch operation starts to be received during a touch process of the first touch operation, maintaining the writing mode;
       when the second touch operation is received first, entering an erasing mode;
       after the second touch operation is received first and the erasing mode is entered, starting to receive the first touch operation during a touch process of the second touch operation, and when a moving distance of the second touch operation from an initial time of receiving the second touch operation to an initial time of receiving the first touch operation is not greater than a first distance threshold, performing mode switching to enter the writing mode from the erasing mode; and
       after the second touch operation is received first and the erase mode is entered, starting to receive the first touch operation during the touch process of the second touch operation, and when the moving distance of the second touch operation from the initial time of receiving the second touch operation to the initial time of receiving the first touch operation is greater than the first distance threshold, maintaining the erasing mode.

14. The non-transitory computer-readable medium according to claim 13, wherein the operations further comprise:
    in the erasing mode, erasing a corresponding handwriting according to touch operation data generated based on the second touch operation, and ignoring the first touch operation.

15. The non-transitory computer-readable medium according to claim 14, wherein after the second touch operation is received first and the erasing mode is entered, starting to receive the first touch operation during the touch process of the second touch operation, and when the moving distance of the second touch operation from the initial time of receiving the second touch operation to the initial time of receiving the first touch operation is not greater than the first distance threshold, performing mode switching to enter the writing mode from the erasing mode comprises:
    restoring handwriting erased in the erasing mode.

16. The non-transitory computer-readable medium according to claim 13, wherein the operations further comprise:
    adding, in the writing mode, handwriting according to the touch operation data generated based on the first touch operation, and ignoring the second touch operation.

17. The non-transitory computer-readable medium according to claim 16, wherein adding, in the writing mode, the handwriting according to the touch operation data generated based on the first touch operation and ignoring the second touch operation comprises:
    acquiring, in the writing mode, touch operation data generated based on a third touch operation, wherein an initial time of receiving the third touch operation is later than the initial time of receiving the first touch operation and the initial time of receiving the second touch operation, wherein
- when the third touch operation meets a preset writing response condition, adding handwriting according to the touch operation data generated based on the third touch operation, or
- when the third touch operation does not meet the preset writing response condition, ignoring the third touch operation, and wherein the preset writing response condition is that a touch area of the third touch operation is not greater than the preset area threshold, and a distance between the initial time of receiving the third touch operation and that of receiving the second touch operation is greater than a second distance threshold.

18. The non-transitory computer-readable medium according to claim 16, wherein after adding, in the writing mode, the handwriting according to the touch operation data generated based on the first touch operation and ignoring the second touch operation, the operations further comprise:
- when a fourth touch operation is detected within a preset duration after the touch operation is completed, maintaining the writing mode.

* * * * *